United States Patent
Yamaguchi et al.

(10) Patent No.: US 6,353,721 B1
(45) Date of Patent: Mar. 5, 2002

(54) COLOR IMAGE FORMATION APPARATUS USING A LIQUID DEVELOPER AND COLOR IMAGE FORMATION METHOD USING A LIQUID DEVELOPER

(75) Inventors: Chiseki Yamaguchi; Kazunori Shindo; Ryosuke Uematsu, all of Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/678,448

(22) Filed: Oct. 3, 2000

(30) Foreign Application Priority Data

Oct. 8, 1999 (JP) ........................................... 11-288828

(51) Int. Cl.[7] ............................................. G03G 15/10
(52) U.S. Cl. ...................... 399/237; 399/302; 399/308
(58) Field of Search .............................. 399/237, 249, 399/250, 251, 299, 302, 308

(56) References Cited

U.S. PATENT DOCUMENTS

| | | | |
|---|---|---|---|
| 5,650,253 A | 7/1997 | Baker et al. | 430/119 |
| 5,698,616 A | 12/1997 | Baker et al. | 523/201 |
| 5,978,631 A | * 11/1999 | Lee | 399/251 |
| 6,047,151 A | * 4/2000 | Carvalho et al. | 399/250 |

FOREIGN PATENT DOCUMENTS

| | | |
|---|---|---|
| JP | 11-84799 | 3/1999 |
| JP | 11-504278 | 4/1999 |
| JP | 11-249444 | 9/1999 |

OTHER PUBLICATIONS

"Dynamic Electrical Conductance Profiles of Liquid Electrophotographic Inks and Corona Devices", *1998 International Conference on Digital Printing Technologies*, IS & Ts NIP 14, pp. 231–234.

* cited by examiner

*Primary Examiner*—Sophia S Chen
*Assistant Examiner*—Hoan Tran
(74) *Attorney, Agent, or Firm*—Ostrolenk, Faber, Gerb & Soffen, LLP

(57) ABSTRACT

Liquid developer of different colors capable of being formed in a film shape are used to form developed images on a plurality of photosensitive drums 10. The developed images are successively transferred from the photosensitive drums 10 onto an image carrier belt 1 so as to be overlaid on one another while applying an electrostatic force. In the color developed image formed on the image carrier belt 1, the solid component ratio of the liquid developer is increased to form the color developed image into a film shape, which is transferred and fixed to a recording medium.

20 Claims, 6 Drawing Sheets

COLOR IMAGE FORMATION APPARATUS USING A LIQUID DEVELOPER AND COLOR IMAGE FORMATION METHOD USING A LIQUID DEVELOPER

BACKGROUND OF THE INVENTION

1. Field of the Invention

The present invention relates to a color image formation apparatus using a liquid developer and a color image formation method using a liquid developer and in particular, to a color image formation apparatus using a liquid developer and a color image formation method using a liquid developer capable of realizing an accurate color expression in overlaying color images and reducing the cost by excluding the necessity of special liquid developer characteristics or high-performance squeeze characteristics.

2. Description of the Related Art

A conventional color image formation apparatus for obtaining a color image by the electronic-photographic method is, for example, disclosed in Japanese Patent Publication 11-84799 [1].

The color image formation apparatus disclosed therein is a tandem type performing an image formation without switching between color developing units and using as a developer a powder developer in which color images are overlaid on a recording medium and fixed by fixing unit for output. In this color image formation apparatus, an image formation is performed without switching the respective color developing units, which enables to form an image at a high speed.

However, in this color image formation apparatus, if powder toner particle is used for development, it is difficult to reduce the toner particle diameter less than 6 micrometers, disabling to obtain a high-quality image developing. Moreover, color images are overlaid on a recording medium whose characteristics are changed by the temperature and humidity and it is difficult to obtain a stable conveying of the recording medium, which makes it difficult to realize a high-quality color image formation. Moreover, in order to fix the color powder developer layer formed on the recording medium at a high speed by a fixing unit, the fixing unit requires an enormous energy. This substantially limits the output speed.

In order to solve this problem, for example, the published Japanese translation of PCT international publication for patent application 11-504278 [2] discloses a color image formation apparatus using a liquid developer, enabling to obtain a high-resolution image formation.

This color image formation apparatus uses as a developer a liquid developer and performs an image formation as follows. A developed image formed on a photosensitive body is transferred onto an intermediate transfer drum and the heat of the intermediate transfer drum heated while the intermediate transfer drum is rotating heats the transferred developed image into a film. This is repeated for each of the developing colors and the filmed images are transferred and fixed on a recording medium all at once. In this color image formation apparatus, use of a liquid developer enables to obtain a high-resolution image formation and color overlaying on the intermediate transfer body enables to obtain a stable color overlaying and transfer. Moreover, since a filmed color images are transferred and fixed onto the recording medium, it is possible to realize a clear color image.

However, in this color image formation apparatus, a single exposure source is used for developing each of the colors, and image transfer onto the intermediate transfer body is repeated for each of the colors. Accordingly, the output speed is lowered. In order to obtain a high-speed output, the intermediate transfer body should rotate at a high speed and the liquid developer units should be switched from one to another at a high speed. This apparatus configuration also has a high cost. Moreover, since the melting point of the toner in the liquid developer used is higher than room temperature and the intermediate transfer body is heated to a high temperature, the photosensitive body is also heated, which disables the obtaining of stable photosensitive body characteristics and shortens the usable life of the photosensitive body.

To cope with this, a color image formation apparatus as shown in FIG. 6 is suggested in "Final Program and Proceedings of IS&T's NIP14: International Conference on Digital Printing Technologies"[3], Oct. 18, 1998. As shown in FIG. 6, this color image formation apparatus is a tandem type and uses a liquid developer. Here, firstly, a belt-shaped photosensitive body 601 is charged by a charger 602 and the charged belt-shaped photosensitive body 601 is subjected to an image exposure using a laser scan optical system 603A. One of the colors (yellow, for example) is developed by the developing unit 604A. Upon completion of the development of the color, the belt-shaped photosensitive body 601 is again charged by the next charger 602B (602C, 603D) and the image is subjected to exposure by the laser scan optical system 603B (603C, 603D). The next color (magenta, cyan, black, for example) is developed and the color image is overlaid on the belt-shaped photosensitive body 601.

The overlaid color images are transferred onto a recording medium 610 (paper, for example) by the transfer roller 605.

However, the color image formation apparatus using a liquid developer shown in FIG. 6 has following problems.

(1) Since the color images are overlaid on the photosensitive body, depending on presence/absence of a preceding toner layer developed, charging cannot be performed with an identical condition; exposure cannot be performed uniformly, i.e., the exposure light quantity applied to the photosensitive body is reduced where the toner layer is present; and the development condition cannot be uniform. This deteriorates an accurate color expression.

(2) Moreover, since a preceding image developed is brought into contact with a liquid developer for the next development, the developed image should be fixed (filmed) so that it will not be disturbed. This requires a special liquid developer characteristic and a high-performance squeeze characteristic, which costs a lot.

SUMMARY OF THE INVENTION

It is therefore an object of the present invention to provide a color image formation apparatus and a color image formation method using a liquid developer, capable of realizing a high-resolution and highly-fine color expression in overlaying the developed images and not requiring a special liquid developer characteristic or a high-performance squeeze characteristic, thereby reducing the cost.

In order to achieve the object mentioned above, the present invention provides a color image formation apparatus using a liquid developer, the apparatus comprising: a plurality of developing units, each containing a liquid developer which can be formed into a film shape; a plurality of electrostatic latent image carriers arranged for the respective developing units; an intermediate unit to which a developed image is electrostatically transferred from the plurality of electrostatic latent image carriers; and a transfer/fixation block for transferring onto a recording medium the developed image which has been formed into a film shape on the intermediate unit.

The transfer process in the transfer/fixation block does not use electrostatic force.

In the configuration mentioned above, it is preferable that the transfer from the intermediate unit to the recording medium be performed using a difference in cohesion and adhesion force.

Moreover, the transfer/fixation block preferably includes a transfer/fixation roller for heating or/and pressing the developed image on the intermediate unit. Moreover, the electrostatic latent image carrier preferably has a drum shape.

Moreover, the intermediate unit preferably has a belt shape.

Moreover, it is preferable that the developed image on the intermediate unit be formed into a film shape by heating the developed image from the opposite side of the intermediate unit not having the developed image.

Moreover, it is preferable that the developing units be in non-contact with the electrostatic latent image carriers when the liquid developer is transferred to develop the electrostatic latent image.

Moreover, it is preferable that the electrostatic latent image carriers be developed by a liquid developer having a higher solid component ratio than that of the liquid developer as initially supplied from the developing unit.

Moreover, it is preferable that the interval between the electrostatic transfers on the intermediate unit be an integral multiple of the circumferential length of the electrostatic latent image carrier, and the electrostatic latent image carriers have an identical circumferential length.

Moreover, it is preferable that each of the electrostatic latent image carriers be replaced together with the corresponding developing unit.

Moreover, the present invention provides a color image formation method using a liquid developer, the method comprising steps of: forming developed images using liquid developers having different colors and capable of being formed into a film shape on a plurality of electrostatic latent image carriers; the developed images on the plurality of electrostatic latent image carrier are successively transferred to a single image carrier belt so as to be overlaid on one another by applying an electrostatic force; increasing the solid component ratio of the liquid developer in the color developed image formed on the single image carrier belt so that the color image is formed into a film shape; and transferring and fixing the color developed image in film shape onto a recording medium.

DESCRIPTION OF THE PREFERRED EMBODIMENTS

Description will now be directed to embodiments of the present invention with reference to the attached drawings.
[Embodiment 1]

Figure 1:
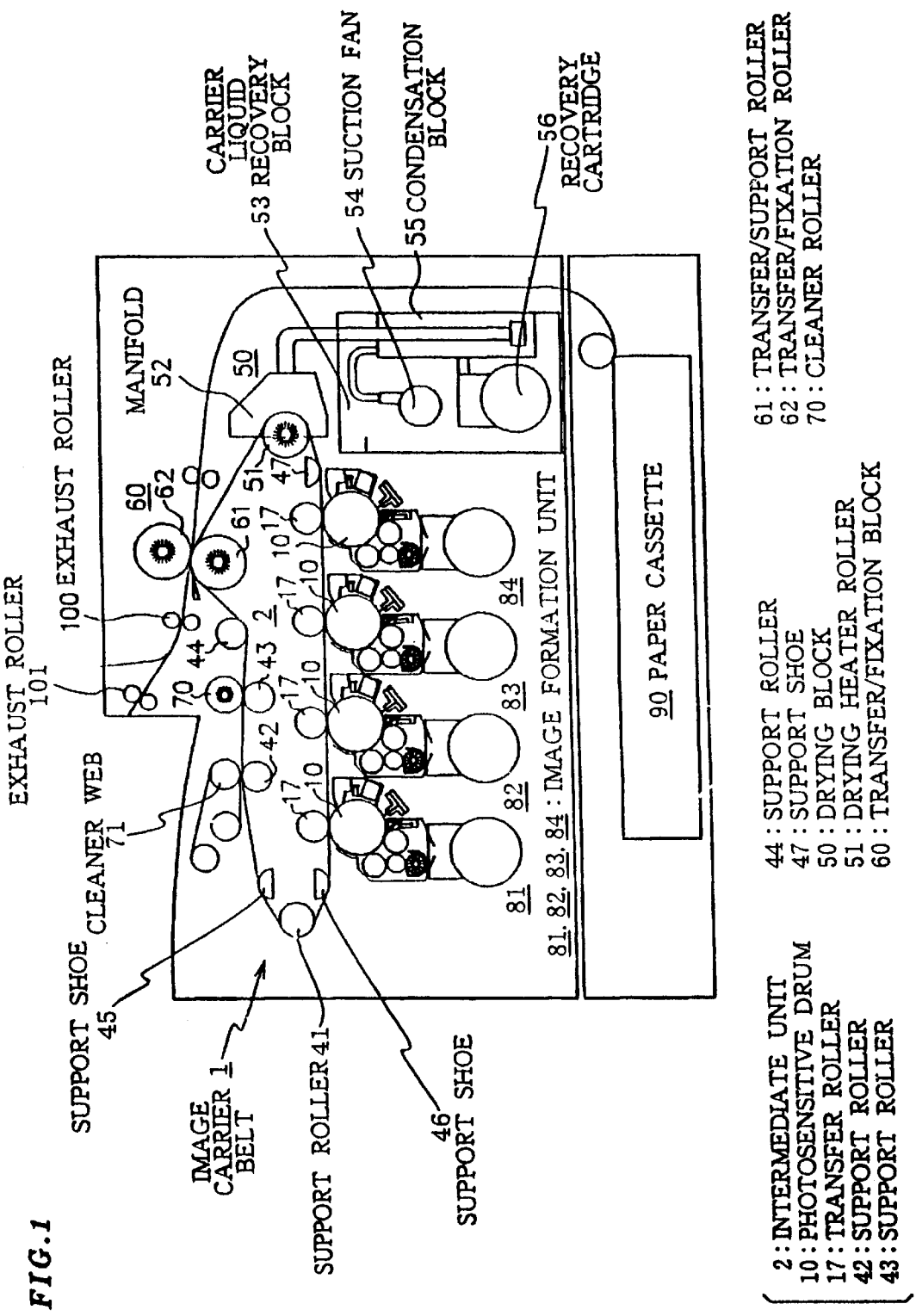
FIG. 1 shows a configuration of a color image formation apparatus using a liquid developer according to a first embodiment of the present invention.

FIG. 1 shows a configuration of a color image formation apparatus using a liquid developer according to a first embodiment of the present invention.

As shown in FIG. 1, this color image formation apparatus includes: an image carrier belt 1, color image formation units 81, 82, 83, and 84, a drying block 50, and a transfer/fixation block 60.

Figure 2:
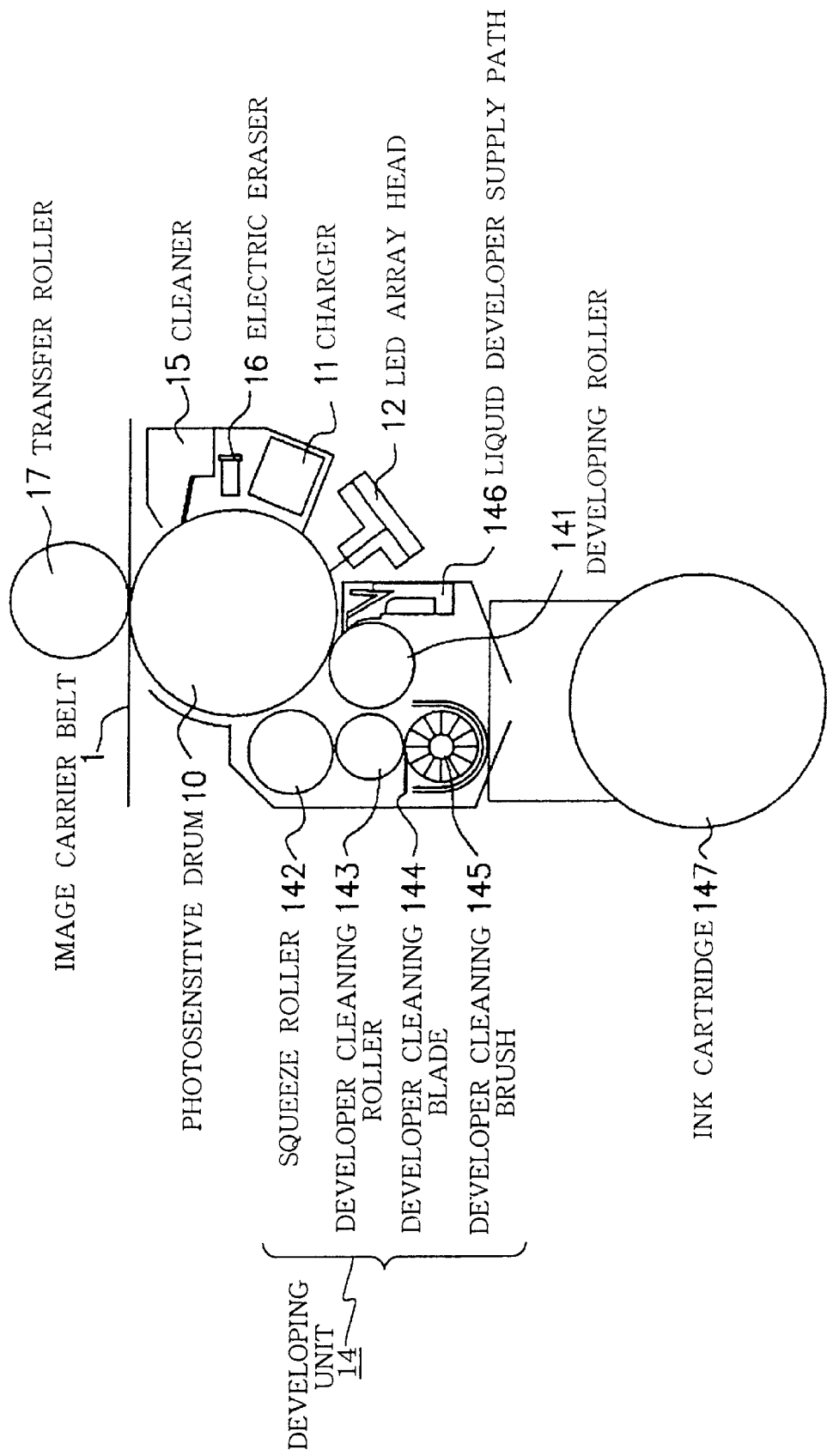
FIG. 2 shows a detailed configuration of a developing unit of the color image formation apparatus using a liquid developer shown in FIG. 1.

FIG. 2 shows a detailed configuration of the image formation unit 81.

As shown in FIG. 2, this image formation unit 81 includes: a photosensitive drum 10, a charger 11 for charging the photosensitive drum 10, an LED array head 12 for performing an image exposure to form an electrostatic latent image on the surface of the charged photosensitive drum 10 according to an image information, a developing unit 14 for developing the electrostatic latent image formed on the photosensitive drum 10, by using a liquid developer, a cleaner 15 for cleaning the surface of the photosensitive drum 10, an electrical eraser 16, and a transfer roller 17 arranged to oppose to the photosensitive drum 10 via the image carrier belt 1 and transfers the developed image formed by the liquid developer on the photosensitive drum 10, to the image carrier belt 1, wherein transfer bias is applied to the transfer roller 17.

The developing unit 14 includes: a developing roller 141, a squeeze roller 142, a developer cleaning roller 143, a developer cleaning blade 144, a developer cleaning brush 145, a circulation pump (not depicted), a liquid developer supply path 146, and an ink cartridge 147. The liquid developer supply path 146, and an ink cartridge 147. The liquid developer used here may be a liquid developer containing dispersed particles of polyester, polystyrene, and other heat-melting fixation type resin as the main content, or a liquid developer capable of being formed into a film by removing excess dispersion solvent (carrier liquid) to increase the solid content ratio in the liquid developer. More specifically, the ink material capable of being formed into a film is disclosed in U.S. Pat. No. 5,650,253 (column 10, line 8 to column 13, line 14) and U.S. Pat. No. 5,698,616. It should be noted that the ink material capable of being formed into a film is a liquid developer containing fine particles (such as toner) having a glass transition point (temperature) lower than room temperature and dispersed in a carrier liquid. Normally, the particles will not agglutinate on contact but when the carrier liquid is removed, the particles will attach to form a layer and become agglutinated into a film at room temperature. The fine particles can be obtained by mixing ethyl alcohol and methyl methacrylate and the glass transition point can be adjusted by changing the mixing ratio.

It should be noted that the other image formation units 82, 83, and 84 also have the identical configuration. The developing units 14 of the respective image formation units 81, 82, 83 and 84 contain a liquid developer of different colors (yellow, magenta, cyan, and black). Moreover, in the respective image formation units 81, 82, 83, and 84, the photosensitive drum and the developing units are collected into a cartridge.

The image carrier belt 1 is made from a PET film and polyimide film coated by a silicon rubber coat or fluorine resin coat.

The photosensitive drum 10 has its upper side in contact with the image carrier belt 1 and is capable of traveling at the same speed as the image carrier belt 1. The photosensitive drum 10 is an organic photosensitive body OPC, and the charger 11 is a corona charger. In the image formation units 81, 82, 83, and 84, the respective photosensitive drums 10 have identical circumferential lengths. Furthermore, the interval between the transfer rollers 17 is identical to the circumferential length of the photosensitive drum 10 or an integral multiple of the circumferential length, so that an error will not be caused by decentering the photosensitive drum 10 from the position matching between the color images.

The drying block 50 includes: a drying heater roller 51 arranged so as to rotate in contact with the inner surface of the image carrier belt 1, a manifold 52 arranged so as to opposed to the drying heater roller 51 and surround the outer surface of the image carrier belt 1, and a carrier liquid recovery block 53 for recovering a carrier liquid vapor and a carrier liquid from the manifold 52. The carrier liquid recovery block 53 includes: a suction fan 54 for sucking a carrier liquid vapor in the manifold 52, a condensation block 55 for condensing the carrier liquid vapor, and a recovery cartridge 56 for recovering the carrier liquid from the condensation block 55.

The transfer/fixation block 60 includes: a transfer support roller 61 for supporting rotation of the image carrier belt 1 and a transfer/fixation roller 62 rotating while pressing the recording medium passing through the transfer/fixation block 60, against the image carrier belt 1. Each of the transfer support roller 61 and the transfer/fixation roller 62 has a heater inside.

The color image formation apparatus further includes: a cleaner roller 70 for cleaning the image carrier belt 1 prior to a color image formation on the image carrier belt 1; a cleaner web 71; support rollers 41 to 44 for supporting rotation-drive of the image carrier belt 1, and support shoes 45 to 47.

The image carrier belt 1 constitutes an intermediate unit 2 together with the transfer roller 17 of the respective image formation units, the drying heater roller 51, the transfer support roller 61, the support rollers 41 to 44, the support shoes 45 to 47, the cleaner roller 70, and the cleaner web 71. A portion of the intermediate unit 2 near the support roller 41 can be raised and lowered as a unitary block with a fulcrum at the point near the drying heater roller 51.

Hereinafter, explanation will be given on operation of the color image formation apparatus using a liquid developer according to the first embodiment with reference to FIG. 1 and FIG. 2.

Firstly, in the image formation unit 81, the photosensitive drum 10 uniformly charged by the charger 11 is subjected to an image exposure by the LED array head 12 according to the yellow image information, so as to form an electrostatic latent image. This electrostatic latent image is developed by a yellow liquid developer in the developing unit 14.

The development is performed as follows. The yellow liquid developer is supplied from the ink cartridge 147 by the circulation pump, through the liquid developer supply path 146 to the portion where the developing roller 141 is in the vicinity of the photosensitive drum 10. A developing electric field is generated between the electrostatic latent image on the photosensitive drum 10 and the developing roller 141 and a charged color solid component in the liquid developer is moved by the developing electric field to the electrostatic latent image on the photosensitive drum 10.

Subsequently, the squeeze roller 142 removes the carrier liquid from the photosensitive drum 10, so as to obtain a carrier liquid ratio necessary for the next transfer step. On the surface of the photosensitive drum 10 that has passed through the developing unit 14, a yellow image is formed by the yellow liquid developer.

In the developing unit 14, the developer cleaning roller 143 removes the liquid developer from the developing roller 141 after the development operation and the liquid developer from the squeeze roller after the squeeze operation. The developer cleaning blade 144 and the developer cleaning brush 145 clean the developer cleaning roller 143, so that a stable development can be obtained. The configuration and operation of this developing unit are detailed in Japanese Patent Publication 11-249444[4].

It should be noted that in the developing unit 14 or/and the ink cartridge 147, the ratio and concentration of the solid component in the liquid developer is automatically controlled so that a liquid developer containing a constant solid component ratio is supplied to the developing roller 141.

The yellow developed image formed on the photosensitive drum 10 is rotated by rotation of the photosensitive drum 10 and brought into contact with the image carrier belt 1 and is transferred to the image carrier belt 1 by the transfer roller 17 arranged in pressed contact with the photosensitive drum 10 having a transfer bias via the image carrier belt 1.

After the transfer, the cleaner 15 removes the liquid developer from the photosensitive drum 10 and the photosensitive drum 10 is electrically erased by the electric eraser 16, so as to be ready for use in the next image forming process.

The identical operation is performed in the other image formation units 82, 83, and 84. In the respective image formation units 81, 82, 83 and 84, the photosensitive drums 10 have an identical circumferential length. The developed images of the respective colors formed on the respective photosensitive drums 10 are successively transferred onto the image carrier belt 1 by the transfer rollers arranged at an interval identical to the circumferential length of the photosensitive drum 10 or an integral multiple of the circumferential length. Even there is decentering of the photosensitive drums 10, the developed images of yellow, magenta, dyan, and black formed on the respective photosensitive drums 10 are transferred to the image carrier belt 1 while being overlaid on one another with an accurate positioning, so that a full color developed image is formed on the image carrier belt 1 which has passed through the image formation unit 84.

The full color developed image formed on the image carrier belt 1 is dried in the drying block 50. That is, the back surface of the image carrier belt 1 is heated by the drying heater roller 51 so that the carrier liquid as a dispersion solvent is almost entirely evaporated and the full color developed image becomes a film-formed full color image. When the liquid developer contains thermal-melting/fixation resin particles dispersed therein, removal of excess dispersion solvent and heating by the drying heater roller enable melting of the dispersed particles into a film. Alternatively, the liquid developer may be such that the removal of excess dispersion solvent (carrier liquid) to increase the solid component ratio in the liquid developer enables the obtaining of a film.

In the drying block 50, the carrier which has been heated and evaporated in the manifold by the drying heater roller 51 is introduced into the condensation block 55 by the suction fan 54 in the carrier liquid recovery block 53 and is condensed into a carrier liquid, which is introduced into the recovery cartridge 56.

The film-formed full color image formed on the image carrier belt 1 which has passed through the drying block 50 and to the transfer/fixation block 60 is transferred with heat and pressure by the rotation support roller 61 and the transfer/fixation roller 62 onto a recording medium (such as paper) conveyed along the carrier belt and obtained according to a set timing from a paper cassette 90 located at the bottom of the apparatus. Thus, a full color image is formed on the recording medium and the medium is expelled out of the apparatus by exhaust rollers 100 and 101. Here, the adhesion force between the film-formed full color image and the image carrier belt 1 is weaker than the adhesion force between the film-formed full color image and the recording medium, whereby the transfer to the recording medium is performed by this difference in the adhesion force with no electrostatic force being applied for this transfer. It should be noted that the cohesion force as a film of the film-formed full color image is greater than the adhesion force to the recording medium.

After the image carrier belt 1 has passed through the transfer/fixation block 60, the clean roller 70 and the cleaner web 71 which each has a heating source inside, a solid component which has not been transferred and harmful substances contained in the solid component which deteriorate the function of the image carrier belt 1 are removed from the image carrier belt 1. After this, the image carrier belt 1 is used for the next color image formation.

During this process sequence, the image carrier belt 1 is supported by the support roller 41 so as to prevent the belt from traveling off course. This enables a stable rotation of the image carrier belt 1 and formation of a color image without distortion and positional shifting on the recording medium.

During the sequence of the processes, the image carrier belt 1 is supported by the support roller 41 so as to prevent it's meandering. This enables to obtain a stable rotation of the image carrier belt 1 and a color image formation without distortion and positional shifting on the recording medium.

After the image formation mentioned above is complete, the portion of the intermediate unit 2 in the vicinity of the support roller 41 is moved upward as a unitary block based on the fulcrum in the vicinity of the drying heater roller 51 and the image carrier belt 1 is removed from the photosensitive drums 10 of the respective image formation units 81, 82, 83 and 84. Moreover, the transfer/fixation roller 62 is removed from the image carrier belt 1.

When an image formation is requested again, the intermediate unit 2 is operated so that the image carrier belt 1 is brought into contact with the photosensitive drums of the respective image formation units 81, 82, 83 and 84 and the transfer/fixation roller 62 is also brought into contact with the image carrier belt 1. This operation of the transfer/fixation roller 62 maybe performed inmatching with the image transfer timing to the recording medium.

The aforementioned disconnection and connection operations are performed because the liquid developer used is a liquid developer that can be film-formed. In case the liquid developer remains on the photosensitive drum 10, the image carrier belt 1, and the transfer/fixation roller 62, if the photosensitive drum 10 and the image carrier belt 1 are left in the contact state, the portions in contact may be attached to each other by the film-forming of the liquid developer, disabling the image formation afterward.

Thus, in the color image formation apparatus using a liquid developer according to the first embodiment, image development of the respective colors are performed independently from one another, enabling to obtain a stable color development of each color. Moreover, electrostatic transfer is performed from the photosensitive drum 10 to the image carrier belt 1, while transfer process from the image carrier belt 1 to the recording medium is performed, though with pressure and heat, by utilizing an adhesion force difference between the materials used. Thus, the transfer energy used for the transfer from the photosensitive drum 10 to the image carrier belt 1 is different from the transfer energy used for the transfer from the image carrier belt 1 to the recording medium. Accordingly, it is possible to set the transfer conditions as are desired in a large condition range. This enables to realize a stable transfer.

Moreover, the developed images in the respective colors are transferred by electrostatic energy to the image carrier belt 1 and then all at once heated into a film and transferred to the recording medium. Thus, it is possible to form an image with low energy consumption. Moreover, since the color images are overlaid on the image carrier belt 1, it is possible to realize a stable overlaying and transfer. In other words, there is no instability which is present in color overlaying and development on the photosensitive drum 10 or in color overlaying and transfer on the recording medium. Moreover, the liquid developer is made into a film by increasing the solid component ratio, and not requiring electric power for development and fixation. Thus, energy consumption can be reduced.

Moreover, since the image formation units 81, 82, 83 and 84 can be constructed with identical constituent members, which enables to reduce the die cost, thereby reducing the entire cost. Moreover, in the respective image formation units 81, 82, 83 and 84, the photosensitive drums 10 and developing units 14 can be contained in a cartridge, which facilitates maintenance and replacement. Moreover, use of a liquid developer enables to obtain a high-resolution and high-quality image. Moreover, the tandem configuration enables to output at a high speed. Moreover, use of the intermediate unit enables to perform an image formation for a variety of recording medium.

Moreover, color overlaying is performed on the intermediate unit 2 and accordingly, it is possible to realize a stable development of the respective colors and a high-resolution color overlaying. Moreover, the drying and transfer/fixation are performed using heat independently of the photosensitive drum. Accordingly, the photosensitive drum can be made from a conventional photosensitive drum material of a low price, without requiring consideration of the thermal characteristics of the material.

[Embodiment 2]

Figure 3:
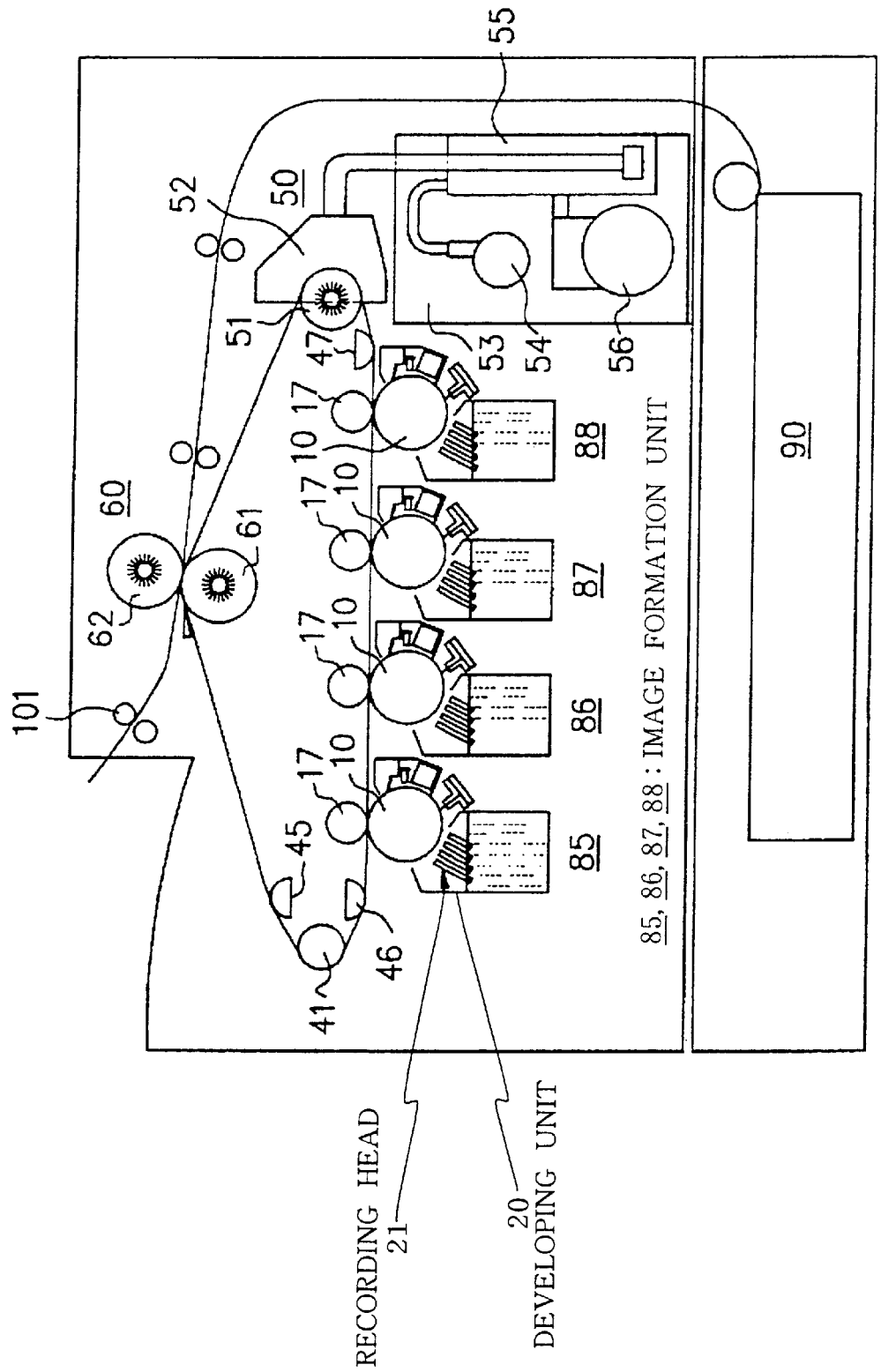
FIG. 3 shows a configuration of a color image formation apparatus using a liquid developer according to a second embodiment of the present invention.

FIG. 3 shows a configuration of a color image formation apparatus using a liquid developer according to a second embodiment of the present invention.

Like the color image formation apparatus using a liquid developer according to the first embodiment shown in FIG. 1, the color image formation apparatus using a liquid developer according to the second embodiment includes as main components: an image carrier belt 1; color image formation units 85, 86, 87, and 88; a drying block 50; and a transfer/fixation block 60.

In the second embodiment, the image carrier belt 1 travels, forming approximately a triangle, and the image formation units 85, 86, 97 and 88 includes developing units 20 having a different configuration from that of the first embodiment. The drying block 50 and the transfer/fixation block 60 have identical configurations as those of the first embodiment. It should be noted that the cleaner roller 70 and the cleaner web 71 are omitted in the figure.

In the second embodiment, the image carrier belt 1 travels, forming approximately a triangle, and the image formation units 85, 86, 87, and 88 includes developing units 20 having a different configuration from that of the first embodiment. The drying block 50 and the transfer/fixation block 60 have identical configurations as those of the first embodiment. It should be noted that the leaner roller 70 and the cleaner web 71 are omitted in the figure.

The image carrier belt 1 should be bent while traveling to rotate. These bending portions affect the stable travel and the service life of the image carrier belt. Accordingly, in the present embodiment, the image carrier belt 1 travels, forming approximately a triangle, so as to reduce the number of bending portions.

The developing unit 20 in the present embodiment does not include a developing roller or a squeeze roller and includes recording heads 21 arranged in a plurality of rows for selectively applying a liquid developer to an electrostatic latent image formed on the photosensitive drum 10.

Moreover, a number of recording electrodes 22 are arranged for each of the rows of the recording heads 21 in the longitudinal direction of the photosensitive drum. An electric field is formed between the electrostatic latent image potential formed on the photosensitive drum 10 and the bias potential applied to the recording electrodes 22, so that a coloring solid component of the liquid developer supplied to the recording electrodes 22 is transferred to the electrostatic latent image to develop the image on the photosensitive drum.

Figure 4:
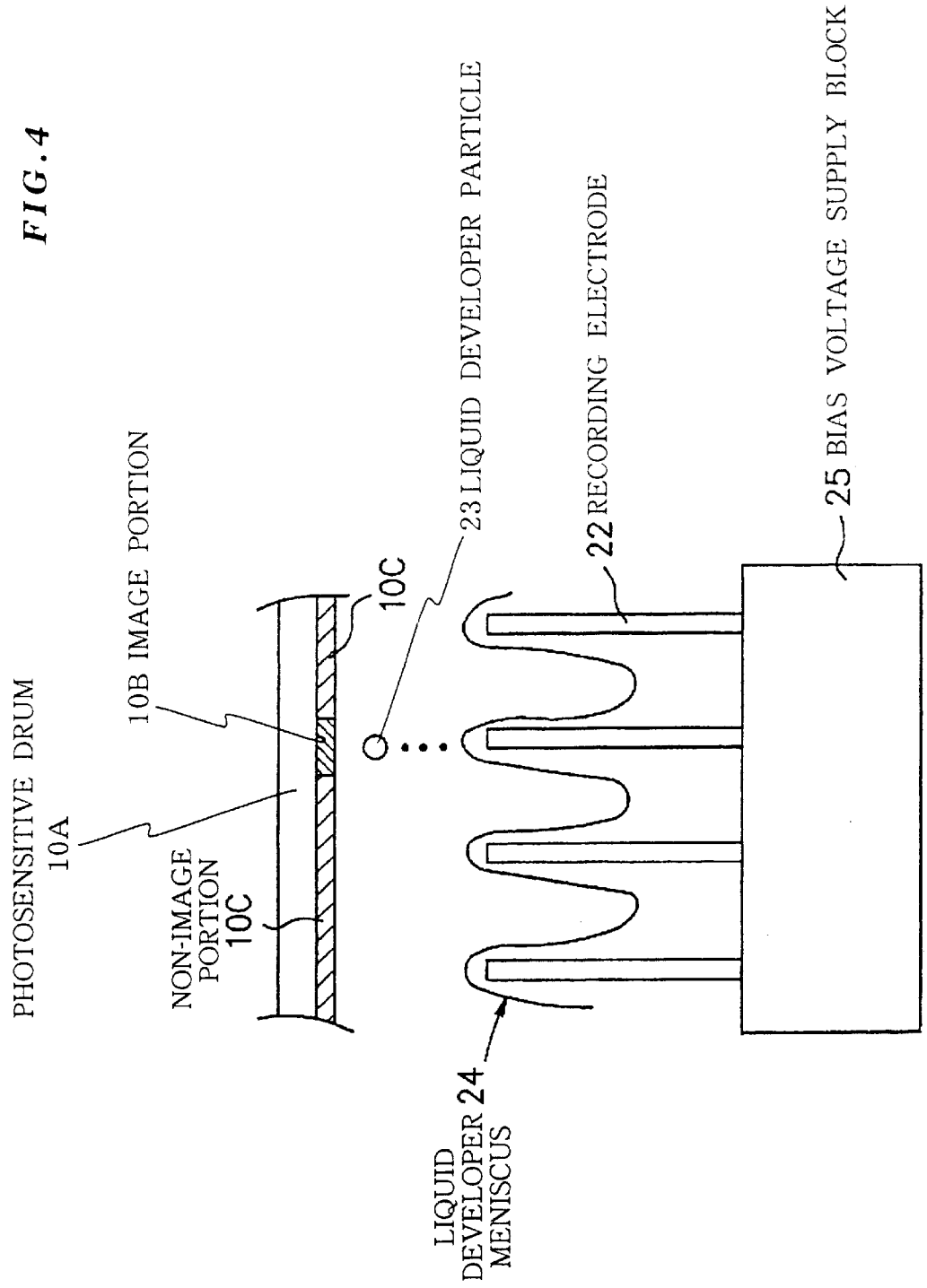
FIG. 4 shows a meniscus of a liquid developer formed around recording electrodes of a developing unit and a liquid particle movement to the image portion in the color image formation apparatus using a liquid developer according to the second embodiment.

Around the recording electrodes 22 is formed a liquid developer meniscus 24 as shown in FIG. 4. A liquid particle 23 is transferred to an electrostatic latent image on the photosensitive drum 10A. Here, the image portion 10B has an electrostatic bias potential of about 50 to 100V applied while a non-image portion 10C has about 500 to 600V applied. When a bias potential of about 1000V is applied via the bias voltage supply block 25 to the recording electrodes 22, the electric field supplies a liquid developer of a higher concentration, i.e., a liquid developer containing a higher ratio of the solid component, to the tips of the recording electrodes 22, and the potential difference between the electrostatic latent image potential of the image portion 10B on the photosensitive drum 10A and the bias potential of the recording electrodes 22 (the threshold value of the potential difference is about 700 to 800V for transferring the liquid developer) transfers the liquid particle 23 of the liquid developer of the higher concentration to the electrostatic latent image portion (image portion) on the photosensitive drum 10A. Moreover, in this developing unit, the developing unit itself serves as an ink cartridge.

The second embodiment has the following effects in addition to the effects obtained by the first embodiment. That is, the electrostatic transfer phenomenon is a process for the liquid developer to be transferred only to the image portion formed on the photosensitive drum. Here, mainly a solid component having an electric charge from the electric field is transferred. Thus, it is possible to prevent adhering of a carrier liquid to the non-image portion as in the contact development process using the conventional developing roller, and to reduce the occurrence of fogging (fogging occurs when a solid component dispersed in the carrier liquid is also transferred and adhered to the non-image portion, causing a stain). In this second embodiment, there is no need for carrier liquid removal by the squeeze roller, which reduces the cost and the size of the apparatus.

Moreover, when a liquid particle is electrostatically transferred from the recording head, the solid component ratio in the transferred liquid developer is almost constant. Accordingly, there is no need of automatic concentration control of solid component ratio in the liquid developer supplied to the recording heads, which further reduces the cost. Moreover, since development is performed by a liquid developer having a high concentration of the solid component, no squeeze roller is required for removing the carrier liquid, which also reduces the size and the cost of the apparatus.

It should be noted that operation of the present embodiment is identical to that of the first embodiment except for that the image carrier belt travels to form a triangle and that operation of the developing unit 20 is different from that of the first embodiment.

[Embodiment 3]

Figure 5:
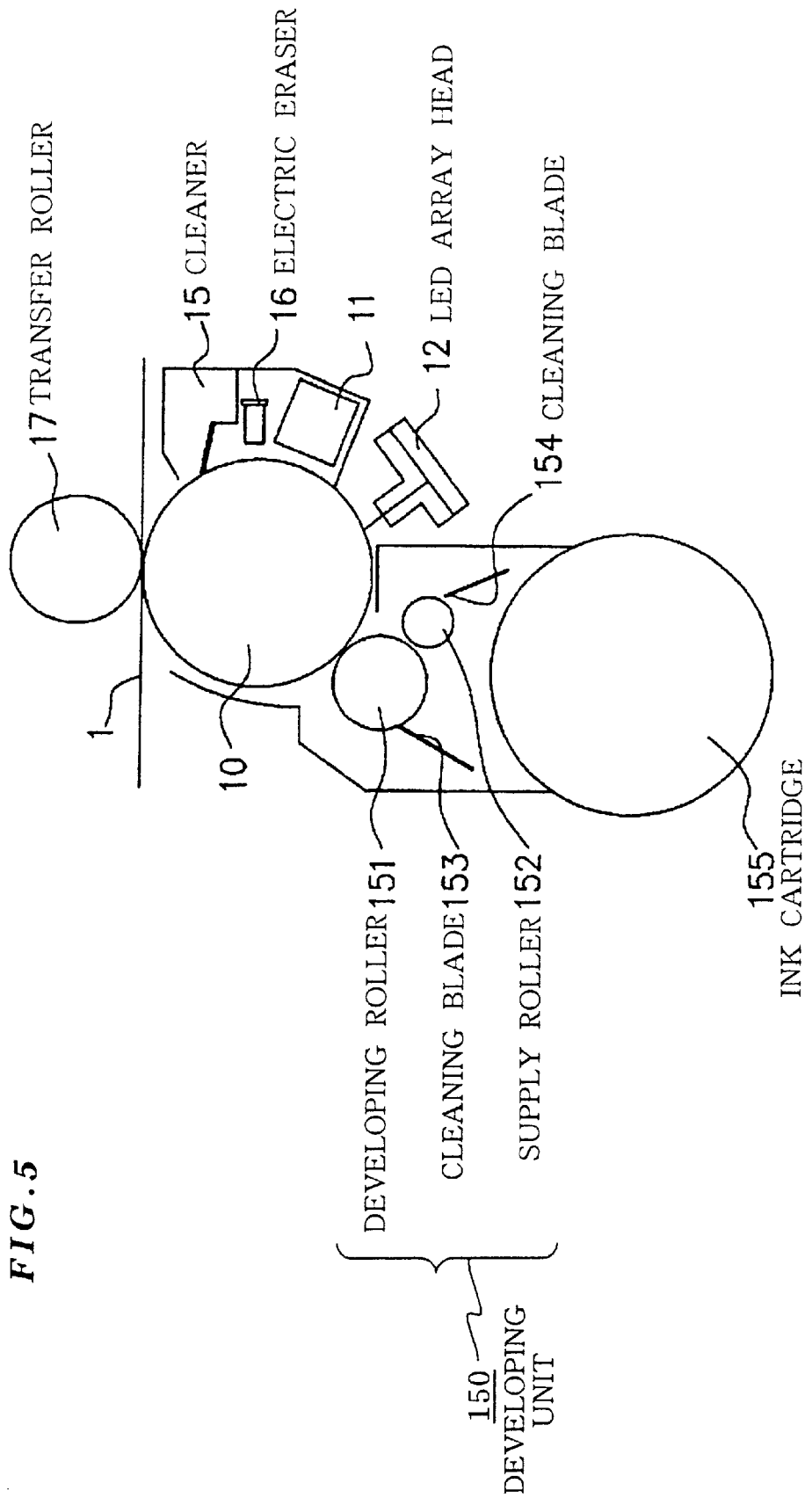
FIG. 5 shows a detailed configuration of a developing unit of a color image formation apparatus using a liquid developer according to a third embodiment of the present invention.
Figure 6:
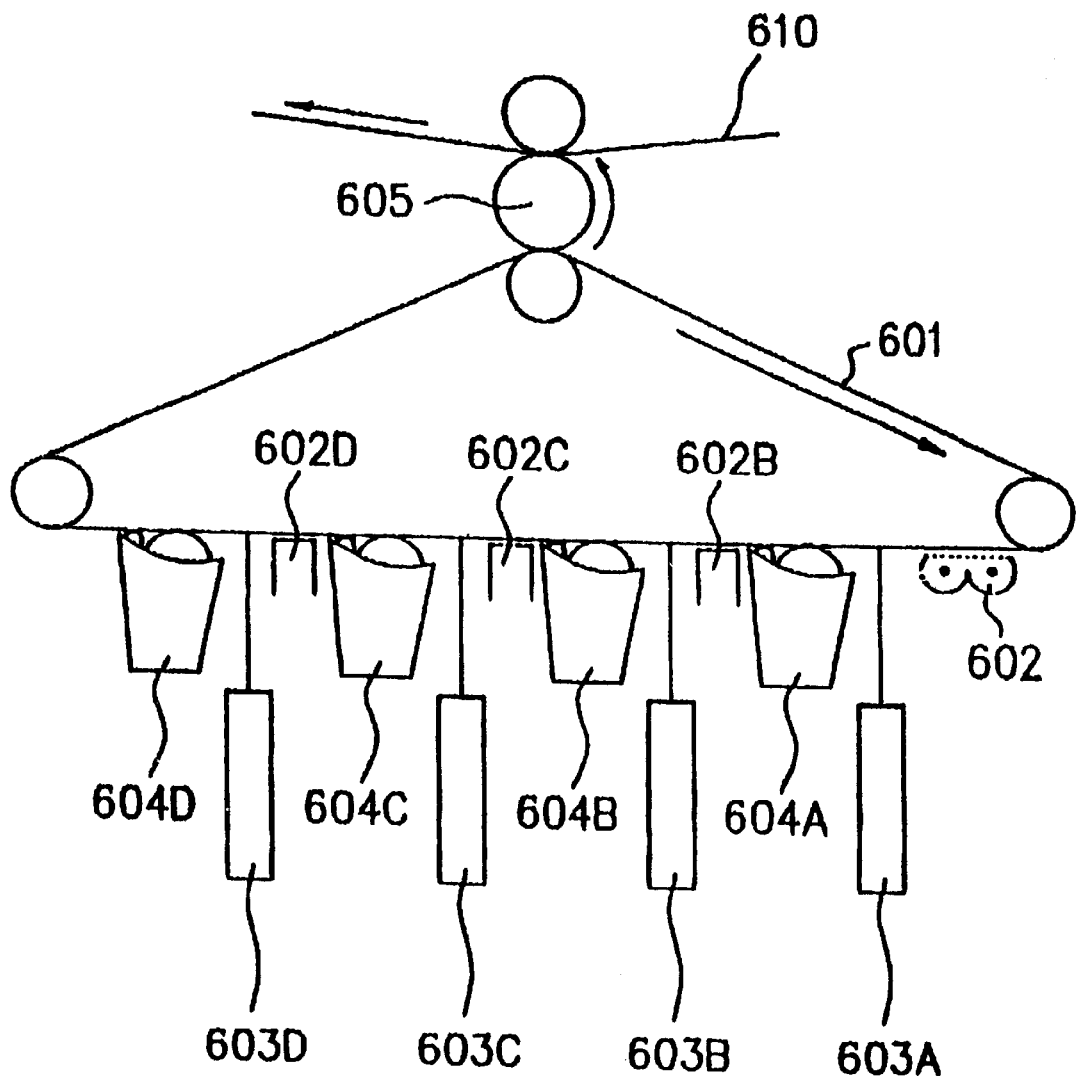
FIG. 6 shows a conventional tandem-type color image formation apparatus using a liquid developer.

FIG. 5 shows a configuration of a color image formation apparatus using a liquid developer according to the third embodiment of the present invention. Excluding the developing unit, the configuration of the third embodiment is identical to that of the first and the second embodiments described with reference to FIG. 1 and FIG. 3, and overlapping explanations will be omitted.

As shown in FIG. 5, the developing unit 150 used in the color image formation apparatus using a liquid developer according to the third embodiment forms on the developing roller 151 a liquid developer layer having a solid component ratio higher than that of the liquid developer supplied from the ink cartridge 155 when developing an electrostatic latent image formed on the photosensitive drum 10 by the developing roller 151, and uses this liquid developer of a higher concentration for development.

By providing a potential difference between the supply roller 152 and the developing roller 151 to form an electric field, on the developing roller 151, there is formed a liquid developer layer of a liquid developer having a higher concentration of the solid component than in the liquid developer supplied from the ink cartridge 155. For the developing roller 151 and the supply roller 152, cleaning blades 153 and 154 are provided for cleaning the surfaces of the respective rollers.

The third embodiment has following effects in addition to the effects obtained by the first and the second embodiment. An electric field is formed between the supply roller 152 and the developing roller 151 and a liquid developer layer formed on the developing roller 151 has a higher concentration of the solid component than that of the liquid developer from the ink cartridge 155. Accordingly, there is no need of a liquid developer supply path, squeeze roller, developer cleaning roller, developing cleaning blade, or developer cleaning brush. This further reduces the size and cost of the developing unit.

It should be noted that in the aforementioned embodiments, the photosensitive drum is used but it can be replaced by an electrostatic latent image carrier made from a dielectric material. The drying block 50 and the transfer/fixation block 60 explained above include a roller having a heater and a heat roller. However, it is also possible to use a line-shaped heating element for heating only the surface in abutment with the image carrier belt. Charging of the photosensitive drum 10 may be performed by using a brush charging or roller charging. The image exposure may use a laser scan optical system.

As has been explained above, the color image formation apparatus using a liquid developer according to the present invention has following effects.

(1) Since image development of each color is performed by the corresponding color image formation unit independently from one another, it is possible to obtain a stable color development.

(2) Moreover, an electrostatic transfer is performed from the photosensitive drum to the image carrier belt while non-electrostatic transfer is performed from the image carrier belt to the recording medium, utilizing a difference in adhesion and cohesion force of the materials. That is, the transfer energy used for transfer from the photosensitive drum to the image carrier belt is different from the transfer energy used for transfer from the image carrier belt to the recording medium. Accordingly, it is possible to set the transfer conditions at desired conditions in a wide range, so as to realize stable transfers.

(3) Moreover, after all the color images developed are transferred onto the image carrier belt, they are heated all at once to be formed into a film and transferred onto the recording medium. Thus, it is possible to form an image with low energy consumption.

(4) Moreover, since the color images are overlaid on the image carrier belt, it is possible to realize a high-resolution and high-quality color expression.

(5) Furthermore, the liquid developer used can be formed into a film by increasing the solid component ratio of the liquid developer. Accordingly, there is not need to provide special liquid developer characteristics or high-performance squeeze characteristics. Moreover, there is no need for electrical power for the developer fixing process. This enables the cost and power consumption of the apparatus to be reduced.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-288828 (Filed on Oct. 8, 1999) including specification, claims, drawings and summary are incorporated herein by reference in its entirety.

What is claimed is:

1. A color image formation apparatus using a liquid developer, the apparatus comprising:
    a plurality of developing units, each containing a liquid developer which can be formed into a film;
    a plurality of electrostatic latent image carriers arranged for the respective developing units;
    an intermediate unit onto which a developed image is electrostatically transferred from the plurality of electrostatic latent image carriers; and
    a transfer/fixation block for transferring onto a recording medium the developed image which has been formed as a film on the intermediate unit.

2. A color image formation apparatus using a liquid developer as claimed in claim 1, wherein the transfer from the intermediate unit to the recording medium is performed using a difference in cohesion and adhesion force.

3. A color image formation apparatus using a liquid developer as claimed in claim 2, wherein the transfer/fixation block includes a transfer/fixation roller for at least one of heating and pressing the developed image on the intermediate unit.

4. A color image formation apparatus using a liquid developer as claimed in claim 3, wherein the intermediate unit is a belt.

5. A color image formation apparatus using a liquid developer as claimed in claim 2, wherein the intermediate unit is a belt.

6. A color image formation apparatus using a liquid developer as claimed in claim 2, wherein the developed image on the intermediate unit is formed into a film by heating the developed image from the side of the intermediate unit not having the developed image.

7. A color image formation apparatus using a liquid developer as claimed in claim 1, wherein the transfer/fixation block includes a transfer/fixation roller for at least one of heating and pressing the developed image on the intermediate unit.

8. A color image formation apparatus using a liquid developer as claimed in claim 7, wherein the intermediate unit is a belt.

9. A color image formation apparatus using a liquid developer as claimed in claim 7, wherein the developed image on the intermediate unit is formed into a film by heating the developed image from the side of the intermediate unit not having the developed image.

10. A color image formation apparatus using a liquid developer as claimed in claim 1, wherein the electrostatic latent image carrier has a drum shape.

11. A color image formation apparatus using a liquid developer as claimed in claim 10, wherein the developing units are not in contact with the electrostatic latent image carriers when the liquid developer is transferred to develop electrostatic latent images respectively formed on the electrostatic latent image carriers.

12. A color image formation apparatus using a liquid developer as claimed in claim 1, wherein the intermediate unit is a belt.

13. A color image formation apparatus using a liquid developer as claimed in claim 12, wherein the developed image on the intermediate unit is formed into a film by heating the developed image form the side of the intermediate unit not having the developed image.

14. A color image formation apparatus using a liquid developer as claimed in claim 1, wherein the developed image on the intermediate unit is formed into a film by heating the developed image from the side of the intermediate unit not having the developed image.

15. A color image formation apparatus using a liquid developer as claimed in claim 1, wherein the developing units are not in contact with the electrostatic latent image carriers when the liquid developer is transferred to develop electrostatic latent images respectively formed on the electrostatic latent image carriers.

16. A color image formation apparatus using a liquid developer as claimed in claim 1, wherein electrostatic latent images respectively formed on the electrostatic latent image carriers are developed by a liquid developer having a higher solid component ratio than that of the liquid developer as initially supplied from the respective developing unit.

17. A color image formation apparatus using a liquid developer as claimed in claim 1, wherein the electrostatic latent image carrier each have an identical circumferential length.

18. A color image formation apparatus using a liquid developer as claimed in claim 17, wherein the interval between the electrostatic transfers on the intermediate unit is an integral multiple of the circumferential length of one of the electrostatic latent image carriers.

19. A color image formation apparatus using a liquid developer as claimed in claim 1, wherein each of the electrostatic latent image carriers is replaceable together with the corresponding developing unit.

20. A color image formation method using a liquid developer, the method comprising steps of:

forming developed images using liquid developers for different colors and capable of being formed into a film on a plurality of electrostatic latent image carriers;

successively transferring the developed images on the plurality of electrostatic latent image carriers to a single image carrier belt so as to be overlaid on one another by applying an electrostatic force;

increasing the solid component ratio of the liquid developer in the color developed image formed on the single image carrier belt so that the color image is formed into a film; and transferring and fixing the color developed image onto a recording medium.

* * * * *